Dec. 8, 1931.　　　M. L. STRAWN　　　1,834,986
CONTROL MECHANISM
Filed Jan. 28, 1928　　　2 Sheets-Sheet 1

Inventor
Marion L. Strawn
by　　　　　Atty

Dec. 8, 1931.  M. L. STRAWN  1,834,986
CONTROL MECHANISM
Filed Jan. 28, 1928   2 Sheets-Sheet 2
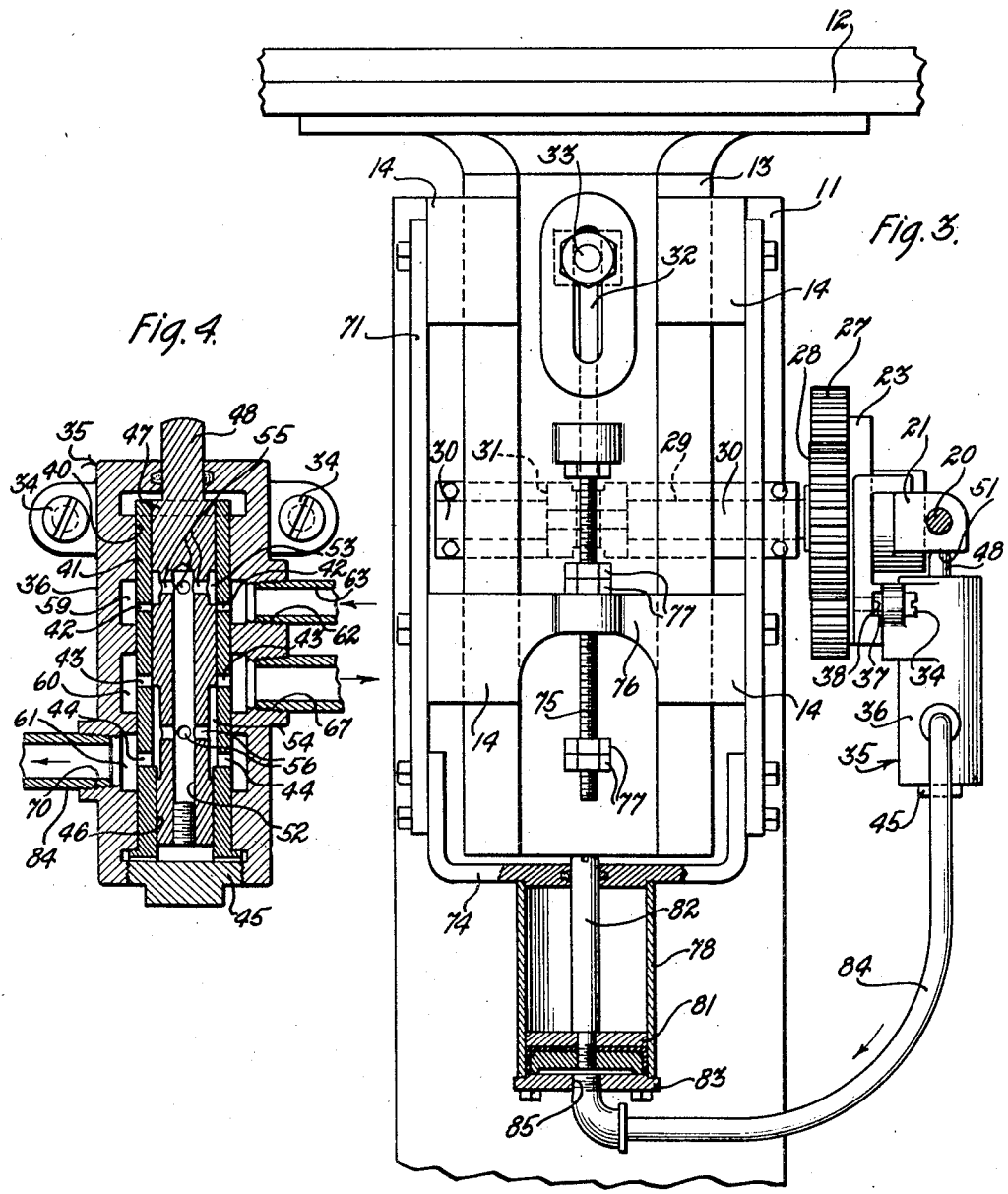
Inventor
Marion L. Strawn
by [signature] Atty.

Patented Dec. 8, 1931

1,834,986

UNITED STATES PATENT OFFICE

MARION LLEWLLYN STRAWN, OF CHICAGO, ILLINOIS, ASSIGNOR TO WESTERN ELECTRIC COMPANY, INCORPORATED, OF NEW YORK, N. Y., A CORPORATION OF NEW YORK

CONTROL MECHANISM

Application filed January 28, 1928. Serial No. 250,325.

This invention relates to control mechanisms, and more particularly to a manually controlled mechanism for controlling the effectiveness of a fluid pressure medium to a power responsive body.

The primary object of this invention is to provide a manually controlled mechanism for accurately and positively controlling the effectiveness of a fluid pressure medium in accordance with the resistance encountered by a movable body.

In one embodiment of this invention as applied to machine tools, and particularly a multiple spindle drill press having a work table adapted to be raised manually by the usual hand lever, there is provided a high pressure fluid medium circulating system whose effectiveness may be varied to raise the table. The effectiveness of the fluid pressure medium is controlled through the operation of the customary lever, which when resistance to the movement of the table is encountered is operated with greater force, and the effectiveness of the pressure medium is likewise increased for supplying sufficient energy to overcome the resistance. Thus the operator is aided in raising the table, but its movement is always under the operator's control through the actuation of the lever, as the force of the pressure medium on the table is several times greater than the pressure applied to the lever. The flow of the medium through the system and the control thereof for operating the drill press is such that it lends itself to the connection in parallel of a group of drill presses in a single circulating system.

Other objects and advantages of this invention will more fully appear from the following detailed description taken in connection with the accompanying drawings, wherein Fig. 1 is a fragmentary side view of a multiple spindle drill press with one embodiment of the control mechanism of this invention applied thereto for operating the work table thereof;

Fig. 3 is a front view of Fig. 2 looking toward the right thereof;

Fig. 4 is an enlarged vertical section taken on the line 4—4 of Fig. 3, and

Figure 1:
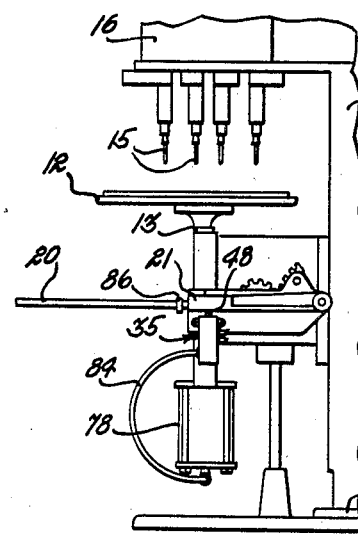

Referring now to the drawings in detail wherein like reference numerals indicate similar parts, particularly Fig. 1, which illustrates a multiple spindle drill press provided with one embodiment of the invention, a base 10 supports a vertical frame 11 upon which the entire mechanism of the multiple spindle drill press is mounted. A work table 12 is secured to an apron 13, the latter being slidable in ears 14 which are fixed to the frame 11 whereby whatever material is placed upon the table 12 may be brought into contact with drills 15 carried from a head 16. The drills 15 may be operated in any suitable manner, the details of which are not shown since they are not believed necessary to a complete understanding of this invention.

Figure 2:
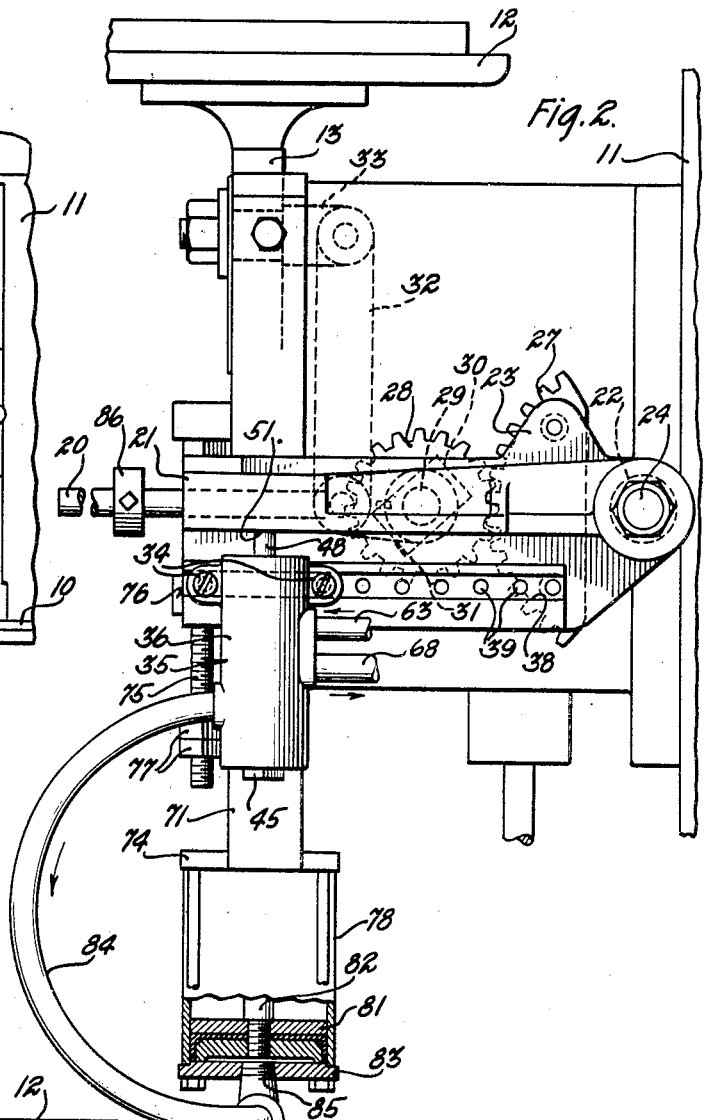
Fig. 2 is a fragmentary side view thereof of an enlarged scale.

The table 12, referring particularly to Fig. 2, is raised by the actuation of a gear and crank mechanism by the movement of a hand lever 20 fixed to a pivotal arm 21, a valve assembly to be presently referred to forming an operative interconnection between the lever and the gear and crank mechanism. The arm 21 is free to pivot upon a bearing boss 22, shown in dotted outline Fig. 2, formed upon a rocking plate 23 in turn free to pivot on a stud shaft 24. Attached to the plate 23 is a gear segment 27 which meshes with a gear 28 keyed to a shaft 29 supported in spaced bearings 30 (Figs. 2 and 3). Keyed to the shaft 29 intermediate the bearings 30 is a lever 31 pivotally connected at its free end to the lower end of a link 32 shown in dotted outline in Figs. 2 and 3, the upper end of the link being pivotally connected to a pin 33 adjustably clamped to the apron 13. It will be apparent that upon the gear segment 27 being rocked counter-clockwise the gear 28, shaft 29 and attached lever 31 will be revolved clockwise, thereby causing the link 32, pin 33 and the attached apron 13 to move upwardly, thus the work table 12 will be raised.

Secured to the plate 23 below the arm 21 by screws 34 is a valve 35. Referring particularly to Fig. 4 the valve 35 comprises an outer supporting casing 36. The casing 36 upon its rear or left side, as viewed in Fig. 3, is provided with a tongue 37 which has a sliding fit in a longitudinal groove 38 formed in the adjacent surface of the plate 23. A plurality of threaded apertures 39 are formed in the plate 23 along the groove 38 into which the screws 34 may be threaded so that the valve may be secured at any one of a plurality of selectable points, the purpose of which will be made apparent as this description progresses. Secured axially within a chamber 40 of the casing 36 is a bushing 41 provided along its length with three uniformly spaced sets of ports 42, 43 and 44, each set comprising four uniformly spaced ports. The lower end of the bushing 41 is equipped with an outwardly extending annular lip which is clamped against an annular surface formed in the casing 36 by a cap 45 screw threaded into an aperture in the lower end of the casing. Mounted in a chamber 46 extending longitudinally through the bushing 41 is a valve piston 47 provided at its upper end with a stem 48 which extends through an aperture in the upper end of the casing 36 and into engagement with a flat horizontal surface 51 formed upon the underside of the arm 21, the arm resting by the action of gravity thereon.

Figure 5:
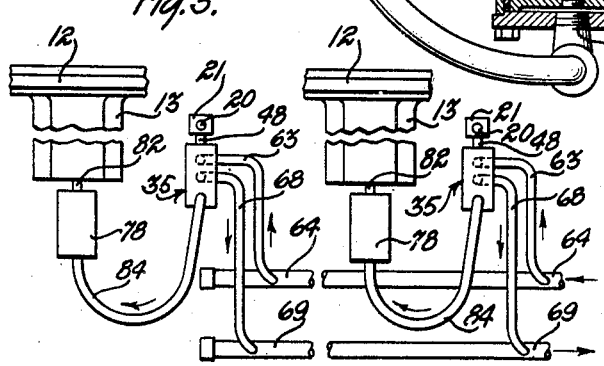
Fig. 5 is a schematic illustration of a group of drill press tables, each equipped with the control mechanism of this invention and supplied with a pressure medium from a common constant high pressure source.

The piston 47 is provided with a chamber 52 along its longitudinal axis, which is closed at each end. The diameter of the piston 47 at its lower end is slightly less than its upper end and fits a correspondingly smaller portion of the chamber 46 of the bushing 41, the purpose of which will become apparent as this description progresses. The peripheral surface of the piston 47 is formed with upper and lower annular grooves forming chambers 53 and 54, respectively, the lower chamber being of considerably greater length than the upper chamber so that it may interconnect the ports 43 and 44 of the bushing 41 in the normal position of the piston as shown in the drawings, the purpose of which will be described hereinafter. A plurality of uniformly spaced ports 55 and 56 are formed in the piston 47 which serve to interconnect the chambers 53 and 54 of the piston 47 with the axial chamber 52 thereof. Formed in the inner circular wall of the casing chamber 40 are three annular grooves or chambers 59, 60 and 61 with which the ports 42, 43 and 44 communicate respectively at all times. The casing chamber 59 is connected through an inlet port 62 with the outlet port of a suitable constant, high fluid pressure medium supply source (not shown) by an intermediate length of flexible pipe 63 connected to a main supply line 64 (Fig. 5), while the casing chamber 60 is connected through an outlet port 67 which is connected to the inlet port of the supply source by a flexible transmission pipe 68 connected to a main return line 69 (Fig. 5). The chamber 61 is provided with a port 70 serving alternately as an outlet and inlet port in the operation of the control mechanism to be described hereinafter. An inelastic pressure medium such as oil may be used with very good results.

Secured to the outer surfaces of the ears 14 upon which the apron 13 slides is a U-shaped strap 71 (Fig. 3), a lower horizontal arm 74 of which is positioned adjacent the lower surface of the apron when the latter is in its normal or lowered position. To the front surface of the apron 13 is secured a threaded rod 75 which freely extends through a bridge piece 76 extending between and integral with the lower pair of ears 14. Threaded onto the rod 75 at each side of the bridge piece 76 are nuts or stop collars 77, which it will be apparent may be adjusted to predeterminedly limit the movement of the apron 13 and consequently the table 12 either in an upward or downward direction. Fixed to the lower surface of the horizontal arm 74 of the strap 71 is a pressure medium feed cylinder 78 provided with a piston 81, a stem or rod 82 thereof extending through the arm which serves as a head to close one end of the cylinder 78, the opposite end thereof being closed by a head 83. A closed flexible transmission line 84 connects the port 70 of the valve casing chamber 61 with the cylinder 78, an aperture 85 being provided in the lower head 83 for the entrance of the pressure medium within the cylinder and against the lower surface of the piston 81. In the normal position of the drill press the piston 81 is maintained in its lowered position as shown in Fig. 3 by the weight of the table 12 and the apron 13, the lower end surface of the apron at all times engaging the upper end of the piston rod 82, in which position the upper stop collar 77 engages the bridge piece 76, no appreciable pressure occurring between the apron and the piston rod.

The operation of the drill press herein described embodying the control mechanism of this invention is as follows: With the parts in the position shown in the drawings, particularly Figs. 3 and 4, and with the main supply line 64 connected to a suitable means (not shown) for supplying a constant high pressure fluid medium thereto, the medium flows from the line 64 through the pipe 63 in the direction indicated by the arrows, the valve casing chamber 59, the bushing inlet ports 42, which are slightly open, the piston chamber 53, returning through the piston ports 56, the piston chamber 54, the bushing outlet ports 43, which are slightly open, the casing chamber 60, the pipe 68 to the return line 69 and back to the source of supply. This is the normal condition, the medium passing through the restricted inlet and outlet ports 42 and 43, respectively, to solely provide for a very small circulation of the medium to prevent sticking of the piston 47, and thence through the bushing ports 44, casing chamber 61 and pipe 84 to the cylinder 78. Due to the greater area of the annular surface of the piston 47 at the upper end of the chamber 54 compared to the lesser diameter at its lower end caused by the difference in diameter of the piston along its length, an unbalanced condition exists in the valve 35, thus the pressure medium will normally exert sufficient pressure on the piston to maintain the stem 48 thereof up against the surface 51 of the arm 21. An adjustable weight 86 is carried on the hand lever 20 so that the downward pressure of the arm 21 against the upper end of the piston 47 will be equal to the pressure of the medium and that created by the weight of the cylinder piston 81 transmitted upward upon the valve piston 47 through the intervening medium, thus a balancing of the forces on opposite sides of the piston 47 occurs. Upon downward pressure being applied to the hand lever 20 this balance is overcome, the inlet ports 42 of the interconnecting valve 35 are thereby opened and the outlet ports 43 are closed. A variable flow of the medium in the system is thus created and the increased back pressure of the medium is immediately exerted on the piston 81 of the cylinder 78 which assists the operator in raising the table 12. It is, of course, understood that the manual force exerted by the operator in depressing the lever 20 to operate the valve is also applied as a portion of the total force required to lift the table 12, through the movement of the entire lever assembly which includes the arm 21 and the plate 23 which function as a single lever pivoting on the shaft 24 and through the segment 27 attached to the plate 23 and associated mechanism hereinbefore described transmits motion to the table.

The manual effort required to raise the table 12 and to complete the drilling operation is thus materially reduced, since only sufficient downward pressure is required on the hand lever 20 to maintain the inlet ports 42 open. The resistance to the upward movement of the table 12 and the consequent engagement of the drills with the work will immediately and positively be evident to the operator by the increased back pressure created in the line which acts to move the valve piston 47 upwardly against the pressure exerted by the operator on the hand lever 20. In the case of the first condition when the operator feels this upward thrust on the lever 20 from the valve piston 47 he increases his pressure downward on the lever in proportion to the upward pressure thereon, thus maintaining the inlet ports 42 open and the upward movement of the table 12 continues. In the case of the latter condition he merely releases the pressure on the lever 20 and raises it. Upon the operator releasing the pressure on the hand lever 20 the drill press and control mechanism will remain in the position to which they have been operated when the lever is released due to the balanced forces acting on opposite sides of the piston 47 as hereinbefore described. The raising of the hand lever 20 closes ports 42 and opens the ports 43 to their full size, thus the back pressure in the closed pipe 84 to the cylinder 78 is released and the weight of the press table 12 forces the medium from the cylinder through the pipe 84, the casing chamber 61, bushing ports 44, piston chamber 54, and through the outlet ports 43, the operating parts of the drill press and control mechanism moving downwardly to their normal position as shown in Fig. 3. One of the principal advantages of this invention is that the operator can feel at all times the behavior of the drills 15 on the work. This is of great advantage, because when the normal progress of the drills are interfered with, or if the operator feels in his hand that the drills are through the work being drilled, he can immediately either further lower the hand lever or release his pressure thereon and raise it in accordance with the condition encountered. The lower stop collars 77 are preferably adjusted on the rod 75 so that they engage the lower surface of the bridge piece 76 when the desired movement of the work carried by the table 12 relative to the drills 15 is accomplished. As hereinbefore described this condition is immediately indicated to the operator, who releases the hand lever 20 and raises it relative to the plate 23 and thus the ports 42 and 43 are opened to their normal size, the table 12 being lowered.

The ratio of the force applied by the operator to the hand lever 20 and the pressure of the medium on the feed cylinder piston 81 can be varied, it will be apparent, by changing the position of the valve 35 with respect to the axis of the arm 21. In the drawings the adjustment is such that a maximum hand pressure is required on the lever 20 to cause the table 12 to be elevated. To reduce this pressure the screws 34 are removed from the apertures 39 and the valve assembly 35 is moved along the groove 38 of the plate 23 and closer to the pivotal point of the arm 21, which is the shaft 24, and rebolted in position by threading the screws into another pair of apertures.

Fig. 5 illustrates schematically a group of drill press tables, each equipped with the control mechanism hereinbefore described and each connected to a common high pressure fluid medium circulating system, comprising supply and return lines 64 and 69, respectively, the medium being supplied to the line 64 by a suitable source (not shown). It will be apparent that the press tables 12 with their associated control mechanism are connected in parallel to the circulating supply and return lines 64 and 69, respectively, whereby the pressure medium may be directed through one of the valves 35 to cause the elevation of the associated table 12 or to a group of the control mechanisms with out effecting the other control mechanisms connected in a similar manner to the same high pressure medium circulating system, or that all of the press tables may be operated simultaneously.

One of the outstanding advantages of the control mechanism hereinbefore described resides in its facile adaptability to commercial types of drill presses without making extensive alterations therein.

Although the invention has been disclosed and described as applied to a particular type of apparatus, it is clear that it may have a more general application and that modifications can be made without departing from the spirit and scope of the appended claims.

What is claimed is:

1. In a mechanism for controlling the movement of a power responsive body, manually operable means directly connected with the body through gear mechanism for moving the body, a fluid pressure medium circulating system having means connected thereto also operable for moving the body, a valve controlled by a movement of the manually operable means for causing the medium operable means to act upon the body in accordance with the manual force applied to the manually operable means, said valve including a piston reciprocably mounted therein having a stem bearing against the manually operable means, and means for allowing the pressure medium normally circulating through the casing and the piston and acting on the latter to maintain the stem thereof in operative engagement with the manually operable means at all times.

2. In a mechanism for actuating a work table, manually operable means including gear mechanism for preliminarily moving the work table, and a fluid pressure system also for moving the table and assisting the manually operable means therein, said fluid pressure system including a piston connected to the work table, a cylinder for actuating the piston, a valve connected with the manually operable means for directing pressure from the fluid pressure system against the piston upon a predetermined movement of the manually operable means to further actuate the work table, the fluid pressure system otherwise being disconnected from the piston, and means in the valve responsive to the pressure of the fluid pressure system for normally maintaining the valve closed.

In witness whereof, I hereunto subscribe my name this 19 day of January A. D., 1928.

MARION LLEWLLYN STRAWN.